United States Patent
Kato

(10) Patent No.: US 9,973,691 B2
(45) Date of Patent: May 15, 2018

(54) PANORAMIC IMAGE GENERATION METHOD AND IMAGE CAPTURING APPARATUS

(71) Applicant: FUJIFILM Corporation, Tokyo (JP)

(72) Inventor: Yasunari Kato, Saitama (JP)

(73) Assignee: FUJIFILM Corporation, Tokyo (JP)

(*) Notice: Subject to any disclaimer, the term of this patent is extended or adjusted under 35 U.S.C. 154(b) by 475 days.

(21) Appl. No.: 14/160,997

(22) Filed: Jan. 22, 2014

(65) Prior Publication Data

US 2014/0132708 A1    May 15, 2014

Related U.S. Application Data

(63) Continuation of application No. PCT/JP2012/064448, filed on Jun. 5, 2012.

(30) Foreign Application Priority Data

Jul. 22, 2011    (JP) .................................. 2011-161328

(51) Int. Cl.
    *H04N 5/232*    (2006.01)
    *G06T 3/40*    (2006.01)

(52) U.S. Cl.
    CPC ....... *H04N 5/23238* (2013.01); *G06T 3/4038* (2013.01)

(58) Field of Classification Search
    CPC ... H04N 5/23238; H04N 5/232; G06T 3/4038

(Continued)

(56) References Cited

U.S. PATENT DOCUMENTS

| 5,170,198 A * | 12/1992 | Cannon | G03B 17/24 |
| | | | 396/320 |
| 6,456,323 B1 * | 9/2002 | Mancuso | G06T 3/4038 |
| | | | 348/218.1 |

(Continued)

FOREIGN PATENT DOCUMENTS

| CN | 1682528 A | 10/2005 |
| EP | 0 884 897 A1 | 12/1998 |

(Continued)

OTHER PUBLICATIONS

International Search Report issued in PCT/JP2012/064448, dated Sep. 4, 2012.

(Continued)

*Primary Examiner* — Tung Vo
*Assistant Examiner* — Zaihan Jiang
(74) *Attorney, Agent, or Firm* — Birch, Stewart, Kolasch & Birch, LLP

(57) ABSTRACT

A panoramic image generation unit 19 which generates a surrounding 360-degree panoramic image data centering around a photographing point using a plurality of photographed image data performs a step of combining the plurality of the photographed image data to generate a surrounding 360-degree or more panoramic image data centering around the photographing point, a step of deforming any one of common subjects of a starting end and a terminal end with respect to the common subject included in each of the starting end and the terminal end of the 360-degree or more panoramic image data, to match sizes and postures of the common subject, and a step of overlapping the common subjects included in the starting end and the terminal end with each other to generate the 360-degree panoramic image data.

9 Claims, 15 Drawing Sheets

(58) Field of Classification Search
USPC .......................................................... 348/36
See application file for complete search history.

(56) References Cited

U.S. PATENT DOCUMENTS

| | | | |
|---|---|---|---|
| 7,095,905 | B1 | 8/2006 | Peterson |
| 2003/0035047 | A1 | 2/2003 | Katayama et al. |
| 2006/0078224 | A1 | 4/2006 | Hirosawa |
| 2008/0211902 | A1 | 9/2008 | Ayaki |
| 2010/0053303 | A1* | 3/2010 | Hayashi ............... G03B 37/00 348/36 |
| 2010/0315673 | A1* | 12/2010 | Matsushita ........... G06F 3/1204 358/1.15 |
| 2011/0043669 | A1 | 2/2011 | Ishida |
| 2011/0115879 | A1 | 5/2011 | Homma et al. |
| 2012/0092482 | A1* | 4/2012 | Shinoda ................ G06T 5/006 348/80 |
| 2012/0307000 | A1* | 12/2012 | Doepke ............... G06T 3/0068 348/36 |

FOREIGN PATENT DOCUMENTS

| | | |
|---|---|---|
| EP | 1 677 534 A1 | 7/2006 |
| EP | 2 128 868 A2 | 12/2009 |
| EP | 2 247 097 A2 | 11/2010 |
| JP | 11-331696 A | 11/1999 |
| JP | 2000-299804 A | 10/2000 |
| JP | 2001-184484 A | 7/2001 |
| JP | 2011-044837 A | 3/2011 |
| JP | 2011-114496 A | 6/2011 |

OTHER PUBLICATIONS

Written Opinion issued in PCT/JP2012/064448, dated Sep. 4, 2012.
Chinese Office Action, Search Report and English translation thereof, dated Aug. 21, 2014, for Chinese Application No. 201280036455.8.
Chinese Office Action and Search Report, dated Jul. 16, 2015, for Chinese Application No. 201280036455.8, along with an English translation.
Chiba et al. "Feature-Based Image Mosaicing", Systems and Computers in Japan, vol. 31, No. 7, pp. 1581-1589 (2000).
European Search Report of EP 12818273.0 dated May 21, 2015.
Malassiotis et al. "Object-Based Coding of Stereo Image Sequences Using Three-Dimensional Models", IEEE Transactions on Circuits and Systems for Video Technology, vol. 7, No. 6, pp. 892-905 (1997).

* cited by examiner

FIG. 3
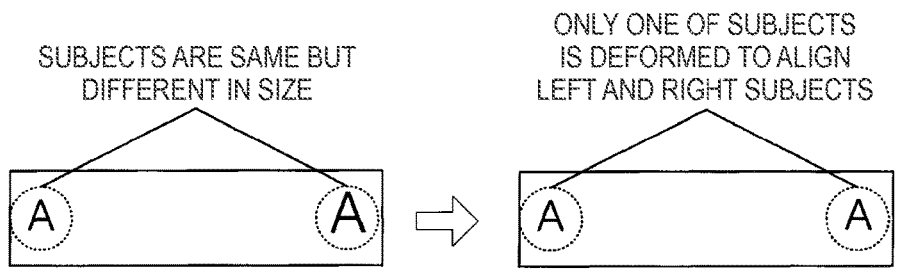
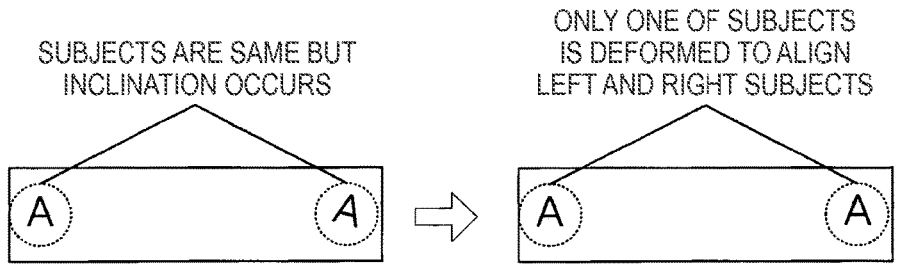
FIG. 4
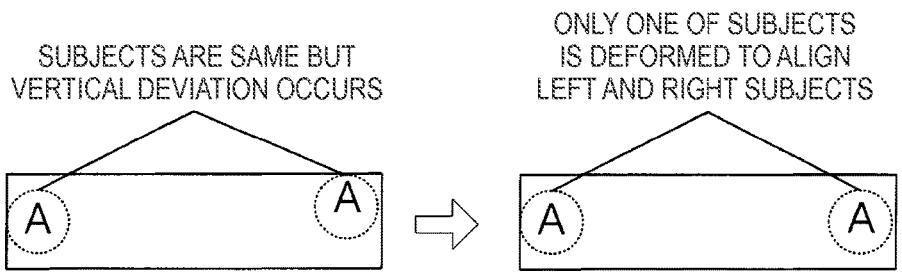

PANORAMIC IMAGE GENERATION METHOD AND IMAGE CAPTURING APPARATUS

CROSS REFERENCE TO RELATED APPLICATION

This is a continuation of International Application No. PCT/JP2012/064448 filed on Jun. 5, 2012, and claims priority from Japanese Patent Application No. 2011-161328, filed on Jul. 22, 2011, the entire disclosures of which are incorporated herein by reference.

TECHNICAL FIELD

The present invention relates to a panoramic image generation method and an image capturing apparatus.

BACKGROUND ART

The latest digital camera equipped with functionality capable of photographing a panoramic image of a whole surrounding of 360 degrees centering around a photographer is widely diffused.

In such a digital camera, a photographer performs photographing a plurality number of times by holding the camera with a hand and rotating the camera while rotating a body of the photographer. Also, image data obtained by photographing the plurality number of times are combined to generate a 360-degree panoramic image data (annular image data).

A 360-degree panoramic image data generation method described in, for example, the following Patent Literatures 1 and 2 has been known.

In Patent Literatures 1 and 2, deviation in the vertical direction in the starting end and the terminal end of the 360-degree panoramic image data is corrected by distorting the entirety of the 360-degree panoramic image data.

CITATION LIST

Patent Literature

Patent Literature 1: JP-A-11-331696
Patent Literature 2: JP-A-2001-184484

SUMMARY OF INVENTION

Technical Problem

In a case where a photographer holds the camera with a hand and photographs a whole surrounding of 360 degrees while rotating a body of the photographer, it is impossible to move the camera in order to make a locus of camera a complete circle which is parallel to a ground surface. Therefore, deviation in image occurs at the starting end and the terminal end of the 360-degree panoramic image data.

For example, as illustrated in FIG. 18, when photographing is started so as to include a subject A in the field angle and then, photographing is performed by rotating the camera in a clockwise direction, the camera may be come closer to the subject A than at the time of the first photographing after rotating the camera by 360 degrees. In this case, the subject A present in the terminal end of the panoramic image generated after the photographing becomes larger than the subject A present in the starting end.

Further, as illustrated in FIG. 19, when photographing is started so as to include the subject A in the field angle and then, photographing is performed by rotating the camera in a clockwise direction, the camera may be inclined to the ground surface than at the time of the first photographing after rotating the camera by 360 degrees. In this case, the subject A present in the terminal end of the panoramic image generated after the photographing becomes an inclined image with respect to the subject A present in the starting end.

Further, as illustrated in FIG. 20, when photographing is started so as to include the subject A in the field angle and then, photographing is performed by rotating the camera in a clockwise direction, the camera may be deviated upwardly to the ground surface than at the time of the first photographing after rotating the camera by 360 degrees. In this case, a position in the vertical direction of the subject A present in the terminal end of the panoramic image generated after the photographing and that of the subject A present in the starting end are deviated from each other.

In order to generate the 360-degree panoramic image data, duplicate portions (subjects A) of the starting end and the terminal end of the panoramic image as illustrated in FIGS. 18, 19 and 20 are to be overlapped with each other. However, as illustrated in FIGS. 18, 19 and 20, when a difference in size or in position occurs between the subject A of the starting end and the subject A of the terminal end, a portion in which the duplicate portions of the starting end and the terminal end of the panoramic image are overlapped becomes unnatural.

A technique for correcting deviation in the vertical direction of the starting end and the terminal end of the panoramic image is described in Patent Literatures 1 and 2. However, the deviation correction described in Patent Literatures 1 and 2 is to deform the entirety of the panoramic image data such that the terminal end of panoramic image data is to be adjusted to the starting end thereof after generating the panoramic image data. Therefore, an image between the starting end and the terminal end of the panoramic image data is distorted and a natural panoramic image cannot be generated. Further, deviation of the size or posture of a common subject in the terminal end and the starting end of panoramic image data has not been taken into account therein.

The present invention has been made in consideration of the problems described above and has an object to provide a panoramic image generation method and an image capturing apparatus capable of generating natural 360-degree panoramic image data without discomfort.

Solution to Problem

It is a panoramic image generation method of the present invention which generates a surrounding 360-degree panoramic image data centering around a photographing point using a plurality of photographed image data, wherein, a same subject is included in each of first photographed image data which is time-serially obtained and last photographed image data which is time-serially obtained among the plurality of the photographed image data, the panoramic image generation method comprising: a first step of combining the plurality of the photographed image data to generate a surrounding 360-degree or more panoramic image data centering around the photographing point; a second step of performing at least one of a first process in which any of the subject of a starting end and the subject of a terminal end is deformed with respect to the subject included in each of the starting end and the terminal end of the surrounding 360-degree or more panoramic image data, to match a size and a posture of the subject of the starting end with those of the subject of the terminal end, and a second process in which any of the subject of the starting end and the subject of the terminal end is deformed with respect to the subject included in each of the starting end and terminal end of the surrounding 360-degree or more panoramic image data, to match positions in a short length direction of the surrounding 360-degree or more panoramic image data; and a third step of overlapping the subjects respectively included in the starting end and the terminal end of the surrounding 360-degree or more panoramic image data with each other, to generate the surrounding 360-degree panoramic image data, after the second step.

It is an image capturing apparatus of the present invention comprising: a panoramic image generation unit configured to perform each step of the panoramic image generation method; and an image capturing unit configured to obtain the plurality of the photographed image data.

Advantageous Effects of Invention

According to the present invention, it is possible to provide a panoramic image generation method and an image capturing apparatus capable of generating a natural 360-degree panoramic image data without discomfort.

BRIEF DESCRIPTION OF DRAWINGS

FIG. 3 is a conceptual diagram for explaining a first process of a second step performed by the panoramic image generation unit 19 of a digital camera illustrated in FIG. 1.

FIG. 4 is a conceptual diagram for explaining a second process of the second step performed by the panoramic image generation unit 19 of a digital camera illustrated in FIG. 1.

DESCRIPTION OF EMBODIMENTS

Hereinafter, an embodiment of the present invention will be described with reference to the accompanying drawings.

Figure 1:
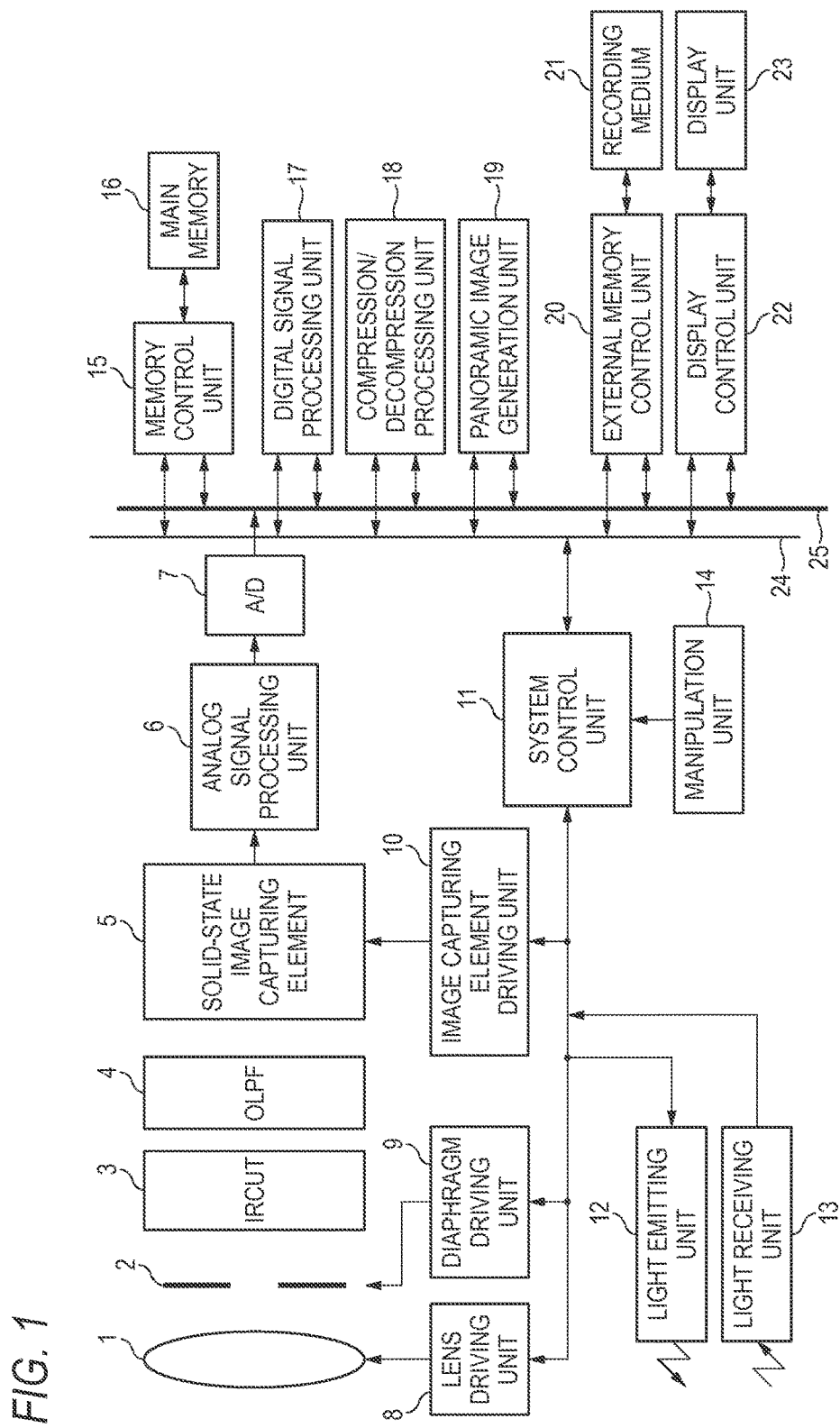
FIG. 1 is a view illustrating a schematic configuration of an image capturing apparatus for explaining an embodiment of the present invention.

FIG. 1 is a view illustrating a schematic configuration of an image capturing apparatus for explaining an embodiment of the present invention. As an the image capturing apparatus, there are an image capturing apparatus such as a digital camera and a digital video camera and an image capturing module mounted on a portable telephone equipped with a camera. Here, the digital camera will be described by way of an example.

An image capturing system of the illustrated digital camera includes a photographing lens 1, a solid-state image capturing element 5 such as a CCD image sensor or a CMOS image sensor, a diaphragm 2 provided between them, an infrared cut filter 3 and an optical low filter 4.

The system control unit 11 which comprehensively controls the entirety of an electrical control system of the digital camera controls a flash light emitting unit 12 and a light receiving unit 13. Further, the system control unit 11 controls a lens driving unit 8 to adjust a position of the photographing lens 1 to a focus position or to perform zoom adjustment. Further, the system control unit 11 controls an aperture of the diaphragm 2 through a diaphragm driving unit 9 to adjust an amount of exposure.

Further, the system control unit 11 drives the solid-state image capturing element 5 through an image capturing element driving unit 10 and outputs an image of the subject captured through the photographing lens 1 as a captured image signal. An instruction signal from a user is input to the system control unit 11 through a manipulation unit 14.

The electrical control system of the digital camera also includes an analog signal processing unit 6 which is connected to the output of the solid-state imaging device 5 and performs an analog signal processing such as correlated double sampling, and an A/D conversion circuit 7 which converts RGB color signals into output from the analog signal processing unit 6 into a digital signal. The analog signal processing unit 6 and the A/D conversion circuit 7 are controlled by the system control unit 11.

Further, the electrical control system of the digital camera includes a main memory 16, a memory control unit 15 connected to the main memory 16, a digital signal processing unit 17 which performs interpolating operation, gamma correction operation and a RGB/YC conversion process, or the like to generate photographed image data, a compression/de compression processing unit 18 which compresses the photographed image data generated in the digital signal processing unit 17 in JPEG format or decompresses the compressed image data, a panoramic image generation unit 19 which combines a plurality of photographed image data obtained by consecutively performing photographing to generate 360-degree panoramic image data, an external memory control unit 20 to which a detachable recording medium 21 is connected, and a display control unit 22 to which a display unit 23 mounted on such as a rear surface of the camera is connected. The memory control unit 15, the digital signal processing unit 17, the compression/de compression processing unit 18, a panoramic image generation unit 19, the external memory control unit 20 and the display control unit 22 are connected with each other by a control bus 24 and a data bus 25 and controlled by instruction from the system control unit 11.

In the digital camera, it is possible to set a panoramic photography mode with which a surrounding 360-degree panoramic image centering around a photographing point (photographer) may be photographed.

After setting the panoramic photography mode, the photographer holds the digital camera with a hand and depresses a shutter button to start photographing. While the shutter button is being depressed, photographing by the solid-state image capturing element 5 is consecutively performed.

After start of the photographing, the photographer rotatatively move the digital camera centering around the photographer to rotatatively move the digital camera by 360 degrees. Also, the photographing is automatically terminated at the time when the digital camera is rotatatively moved by 360 degrees.

A plurality of the photographed image data are generated by the consecutive photographing in the digital signal processing unit 17. The same subject (principal subject) is included in the first photographed image data which is time-serially obtained (data obtained by photographing at a rotation angle of 0 degree) and the last photographed image data which is time-serially obtained (data obtained by photographing at a rotation angle of 360 degrees) of the plurality of the photographed image data.

The panoramic image generation unit 19 generates the 360-degree panoramic image data using the plurality of the photographed image data. Hereinafter, a 360-degree panoramic image data generation method by the panoramic image generation unit 19 will be described.

The panoramic image generation unit 19 generates the 360-degree panoramic image data using three steps which are roughly divided.

At a first step, the panoramic image generation unit 19 combines a plurality of the photographed image data obtained by consecutively performing photographing and generates a surrounding 360-degree or more panoramic image data centering around the photographing point.

Here, the expression of the surrounding 360-degree or more panoramic image data is because a subject at the time of start of photographing in the consecutive photographing and a subject at the time of end of photographing are overlapped and thus, when the plurality of the photographed image data are simply combined, it does not become the panoramic image data of just 360 degrees, but becomes the panoramic image data of 360 degrees+α.

At a subsequent second step, a first process in which any one of the subject of the starting end and the subject of the terminal end is deformed with respect to the same subject included in each of the starting end (a portion trimmed from the photographed image data obtained at the rotation angle of 0 degree) and the terminal end (a portion trimmed from the photographed image data obtained at the rotation angle of 360 degrees) of the 360-degree or more panoramic image data, to match the size and the posture of the subject of the starting end with those of the subject of the terminal end, and a second process in which any one of the subject of the starting end and the subject of the terminal end is deformed with respect to the same subject included in each of the starting end and the terminal end of the 360-degree or more panoramic image data, to match the positions in a short length direction of the 360-degree or more panoramic image data are performed in this order.

At a subsequent third step, the 360-degree panoramic image data is generated by overlapping the common subjects with each other, respectively included in the starting end and the terminal end of the 360-degree or more panoramic image data being obtained after the second step.

Figure 2:
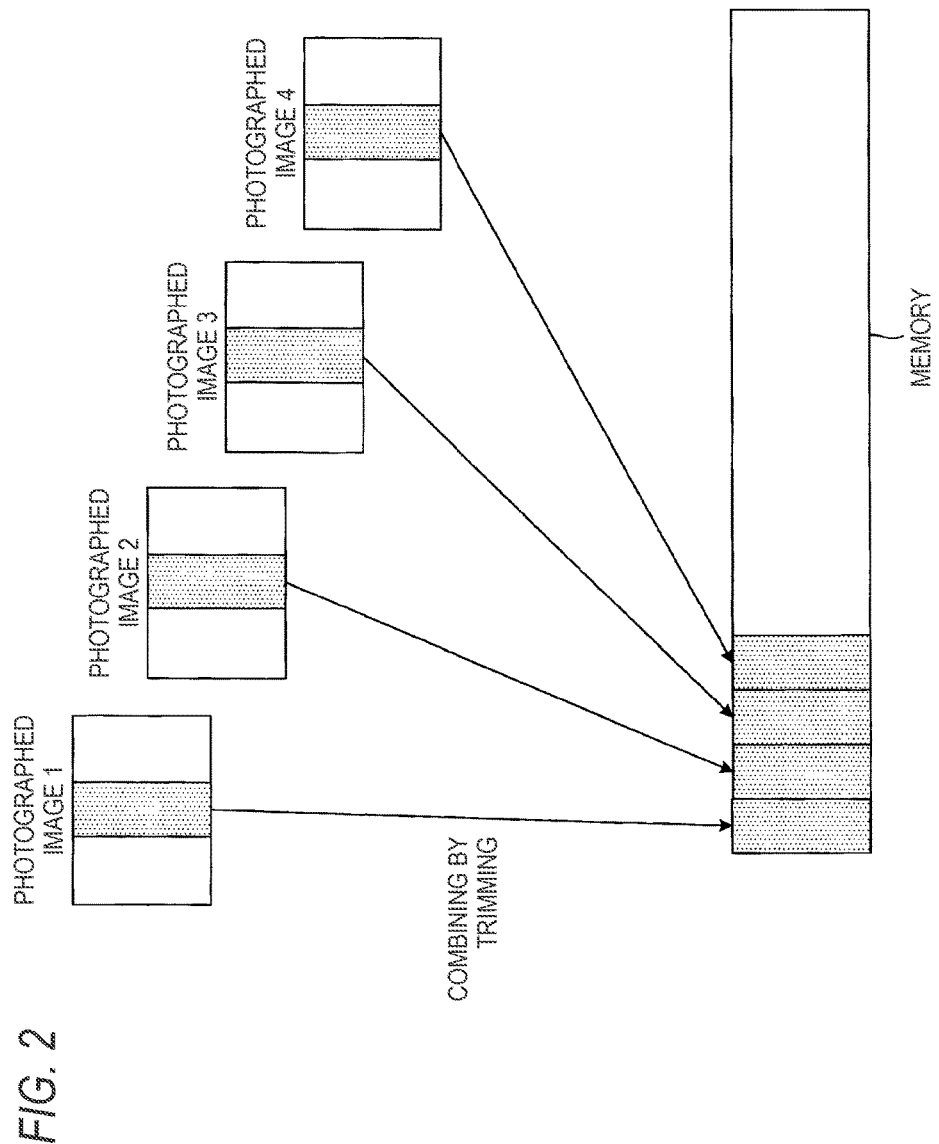
FIG. 2 is a conceptual diagram for explaining a first step performed by a panoramic image generation unit 19 of a digital camera illustrated in FIG. 1.

FIG. 2 is a conceptual diagram for explaining the first step. Here, an example for a case where a photographer rotates the digital camera in a clockwise direction centering around the photographer.

When a first photographed image data (photographed image 1) and a second photographed image data (photographed image 2) are generated, the panoramic image generation unit 19 obtains the amount of movement between the photographed image 1 and the photographed image 2.

Also, the panoramic image generation unit 19 trims a central portion in a long length direction of each of the photographed image 1 and the photographed image 2 and combines the trimmed image as illustrated in FIG. 2.

In this case, the panoramic image generation unit 19 deviates the trimmed image of the photographed image 2 relative to the trimmed image of the photographed image 1 by the amount of movement and overlaps the trimmed image of the photographed image 2 with the trimmed image of the photographed image 1 to perform combining.

When a third photographed image data (photographed image 3) is generated, the panoramic image generation unit 19 obtains the amount of movement between the photographed image 2 and the photographed image 3.

Also, the panoramic image generation unit 19 trims a central portion of the photographed image 3 and combines the trimmed image with the trimmed image of the photographed image 2 according to the amount of movement.

The panoramic image generation unit 19 performs the same processing for a fourth and after photographed image data to generate the 360-degree or more panoramic image data.

Further, the 360-degree or more panoramic image data generation method is not limited to that illustrated in FIG. 3, and may use a well-known method.

FIG. 3 is a conceptual diagram for explaining a first process performed in the second step.

The same subject A is included in the starting end and the terminal end of the 360-degree or more panoramic image data generated at the first step.

Figure 18:
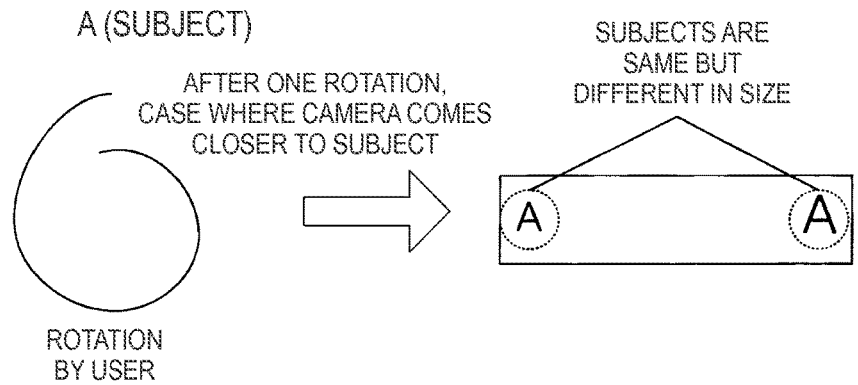
FIG. 18 is an explanatory view for a case where the subjects of the starting end and the terminal end of the 360-degree panoramic image data become different in their size.
Figure 19:
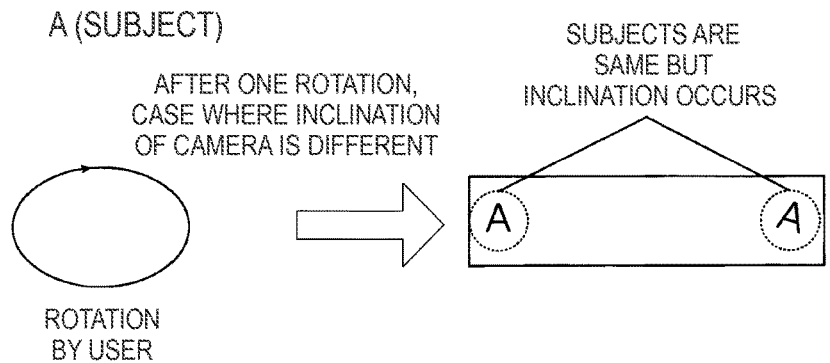
FIG. 19 is an explanatory view for a case where the subjects of the starting end and the terminal end of the 360-degree panoramic image data become different in their posture.

When a phenomenon as described in FIG. 18 or FIG. 19 occurs, as illustrated in FIG. 3, the subject A included in the starting end of the 360-degree or more panoramic image data becomes larger than or inclined with respect to the subject A included in the terminal end of the 360-degree or more panoramic image data, or vice versa.

The subject A illustrated in FIG. 18 is a closer subject than a background image projected by the panoramic image data. That is, the subject A is a subject for which the photographing angle of view is changed to the extent that it may be viewed visually due to movement of the camera which comes closer to or far away from the subject than at the time of the first photographing after rotatatively moving the camera by 360 degrees.

Accordingly, the panoramic image generation unit 19 performs a first process first, in which, as illustrated in FIG. 3, the subject A of the terminal end of the 360-degree or more panoramic image data is deformed to match the size and the posture of the subject A of the terminal end with those of the subject A of the starting end, at the second step.

Further, in the first process, the subject A of the starting end may be modified to match the subject A of the starting end and the subject A of the terminal end. Details of the first process will be described later.

FIG. 4 is a conceptual diagram for explaining a second process performed at the second step.

The same subject A is included in the starting end and the terminal end of the 360-degree or more panoramic image data generated at the first step.

Figure 20:
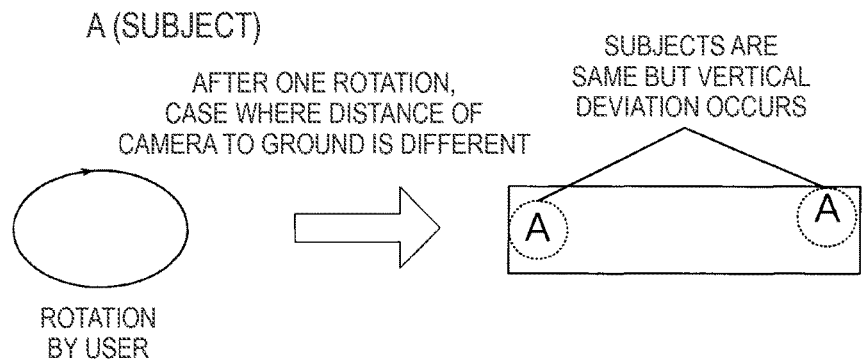
FIG. 20 is an explanatory view for a case where the subjects of the starting end and the terminal end of the 360-degree panoramic image data become different in their vertical position.

When a phenomenon as described in FIG. 20 occurs, as illustrated in FIG. 4, deviation of the 360-degree or more panoramic image data in the short length direction is generated between the subject A included in the starting end of the 360-degree or more panoramic image data and the subject A included in the terminal end of the 360-degree or more panoramic image data.

Accordingly, the panoramic image generation unit 19 performs a second process first, in which, as illustrated in FIG. 4, the subject A of the terminal end of the 360-degree or more panoramic image data is deformed to match the position in the short length direction of the subject A of the terminal end with that of the subject A of the starting end, after performing the first process.

Further, in the second process, the subject A of the starting end may be deformed to match the subject A of the starting end and the subject A of the terminal end. Details of the second process will be described later.

As described above, both the first process and the second process are performed in this order to obtain the amount of deviation after matching the subject A of the starting end with that of the terminal end and thus, it is possible to more accurately match the subjects A.

Figure 5:
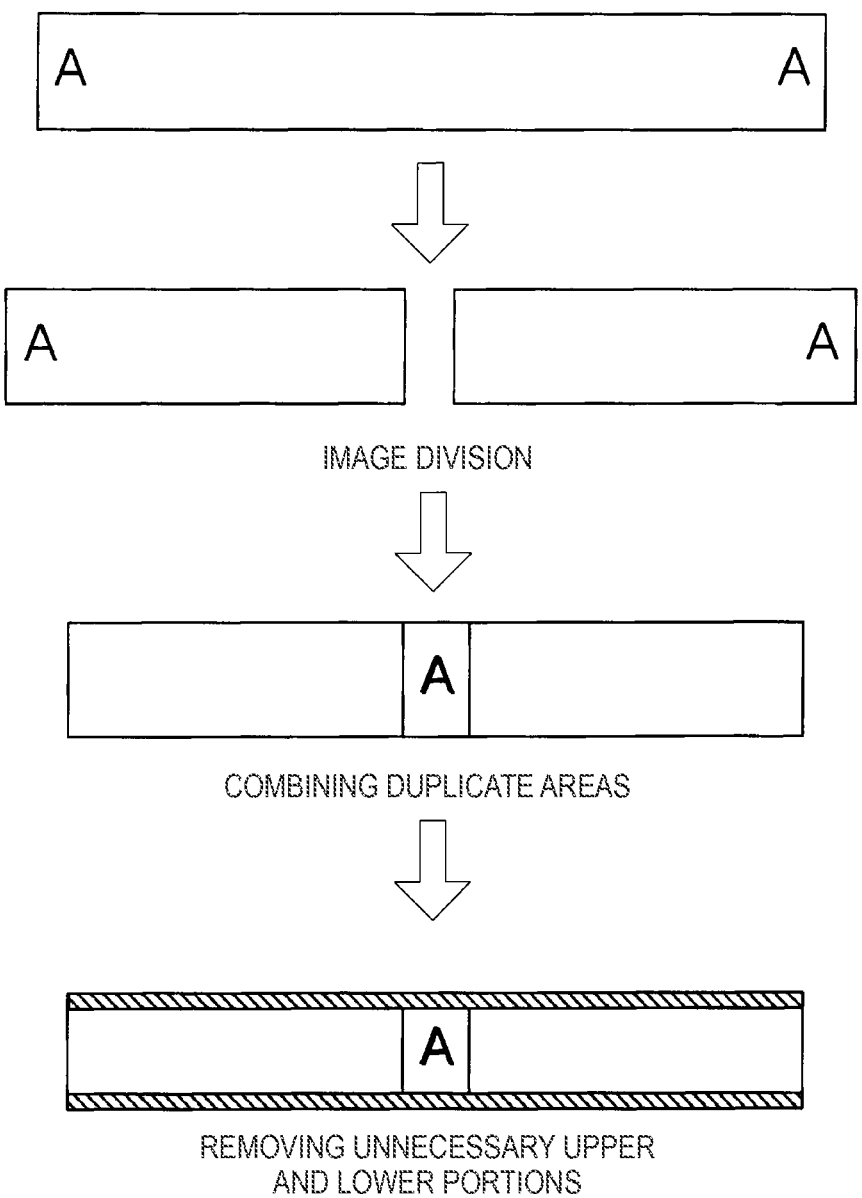
FIG. 5 is a conceptual diagram for explaining a third step performed by the panoramic image generation unit 19 of a digital camera illustrated in FIG. 1.

FIG. 5 is a conceptual diagram for explaining a third step.

The panoramic image generation unit 19 performs the second step to obtain the 360-degree or more panoramic image data in which the position, posture and size of the subject A of the starting end are matched with those of the subject A of the terminal end and then, divides the 360-degree or more panoramic image data into two.

Subsequently, the panoramic image generation unit 19 overlaps the subjects A respectively included in the starting end and the terminal end of obtain the 360-degree or more panoramic image data with each other as illustrated in FIG. 5. At this time, the 360-degree panoramic image data is generated.

It is possible to make it easy to perform the combining process by dividing the 360-degree or more panoramic image data and handling the 360-degree or more panoramic image data as two image data.

Finally, the panoramic image generation unit 19 removes an upper portion and a lower portion of the 360-degree panoramic image data (trims a central portion in the short length direction) and completes the 360-degree panoramic image data, as illustrated in FIG. 5.

Further, a dividing number in the third step may be three or more. Further, the dividing of the 360-degree or more panoramic image data may be performed before the second step. Further, in FIG. 5, a dividing position of the 360-degree or more panoramic image data is set as the center in the long length direction but, the dividing position may be any position other than the center.

Next, operations described above will be described with reference to the flowchart of FIG. 6.

Figure 6:
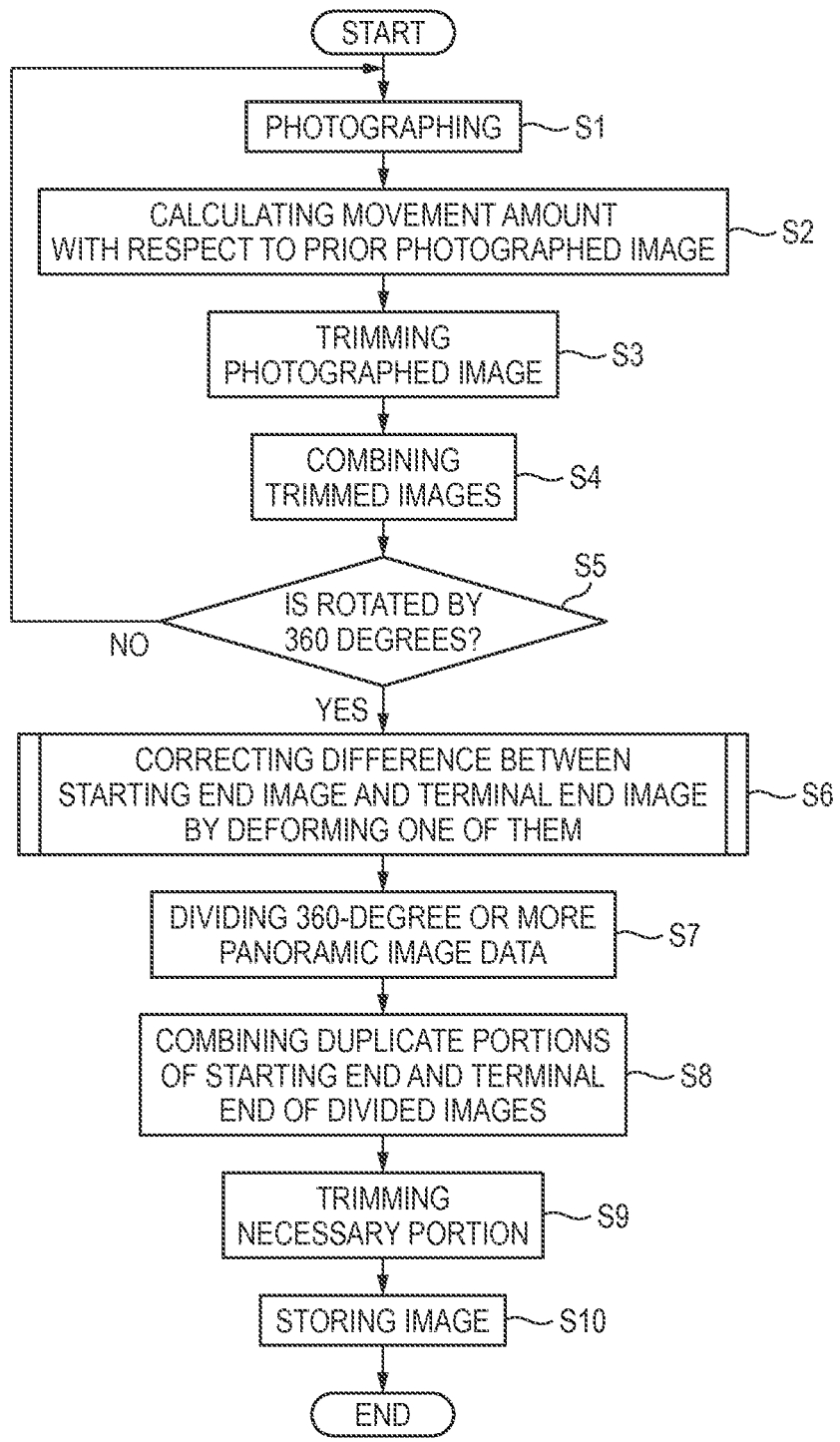
FIG. 6 is a flowchart for explaining operations at the time of a panoramic photography mode of the digital camera illustrated in FIG. 1.

FIG. 6 is a flowchart for explaining operations at the time of a panoramic photography mode of the digital camera illustrated in FIG. 1.

When the shutter button is depressed, the solid-state image capturing element 5 starts photographing (step S1). When the second photographing is completed and the photographed image data is generated by the digital signal processing unit 17, the panoramic image generation unit 19 calculates the amount of movement of the second photographed image data with respect to the first photographed image data (step S2).

The amount of movement may be calculated with a well-known method by comparison of each captured image data. For example, it is obtained by an image processing technology such as a background difference method or an inter-frame difference method.

Next, the panoramic image generation unit 19 trims the central portion of each of the first photographed image data and the second photographed image data (step S3) and combines the trimmed images according to the amount of movement calculated at step S2 (step S4).

Next, the system control unit 11 determines whether the digital camera has rotated by 360 degrees from a time point of starting photographing (step S5).

A motion detection unit, not illustrated, such as a gyro sensor is provided in the digital camera such that a rotation angle of the digital camera may be detected. The system control unit 11 performs a determination of step S5 based on information from the motion detection unit.

When the digital camera is not rotated by 360 degrees (step S5:NO), the system control unit 11 controls the image capturing element driving unit 10 to cause the solid-state image capturing element 5 to perform next photographing (returns to step S1).

When the digital camera is rotated by 360 degrees (step S5:YES), the system control unit 11 controls the image capturing element driving unit 10 to end photographing by the solid-state image capturing element 5. Further, in this case, since the 360-degree or more panoramic image data has been generated at step S4, the panoramic image generation unit 19 performs the process of step S6.

At step S6, the panoramic image generation unit 19 continuously performs the first process illustrated in FIG. 3 and the second process illustrated in FIG. 4 to match the positions, sizes and postures of the common subjects respectively included in the starting end and the terminal end.

Next, the panoramic image generation unit 19 divides the 360-degree or more 360 panoramic image data into two (step S7).

Next, the panoramic image generation unit 19 overlaps the common subjects (duplicate portions) respectively included in the two divided image data with each other and combines the two divided image data to generate the 360- degree panoramic image data (step S8). Filtering may be performed at the time of the combining such that a combining place is made inconspicuous.

Next, the panoramic image generation unit 19 trims the central portion in the short length direction of the 360-degree panoramic image data as illustrated in FIG. 5 (step S9).

Finally, the panoramic image generation unit 19 records the trimmed 360-degree panoramic image data in the recording medium 21 through the external memory control unit 20 (step S10), and ends the process.

Figure 7:
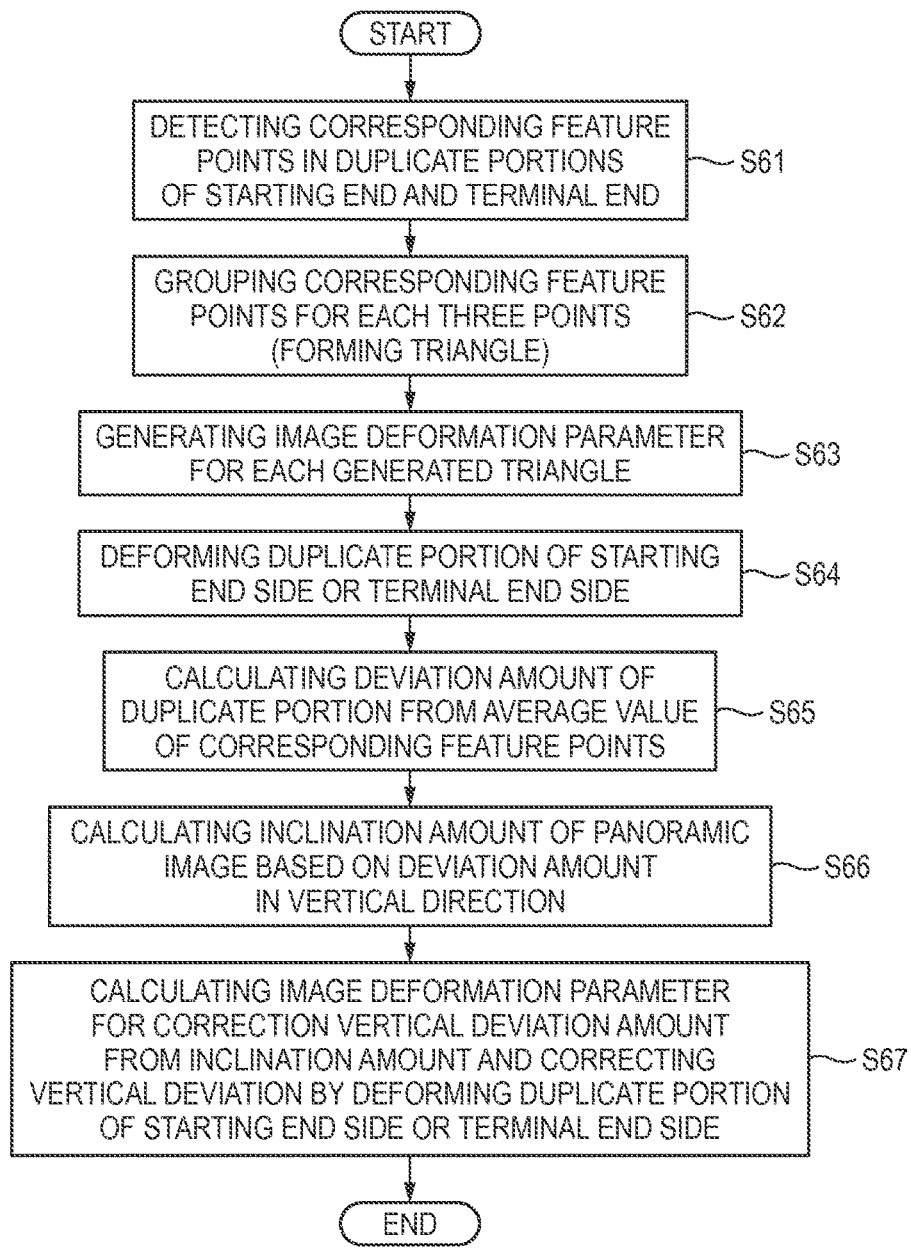
FIG. 7 is a flowchart for explaining details of step S6 in FIG. 6.

FIG. 7 is a flowchart for explaining details of step S6 in FIG. 6.

First, the panoramic image generation unit 19 detects feature points of the principal subject included in the starting end of the 360-degree or more panoramic image data and feature points in the terminal end of the 360-degree or more panoramic image data that correspond to the feature points from the starting end and the terminal end of the 360-degree or more panoramic image data using a KLT method or a SHIFT method or the like (step S61).

Figure 8:
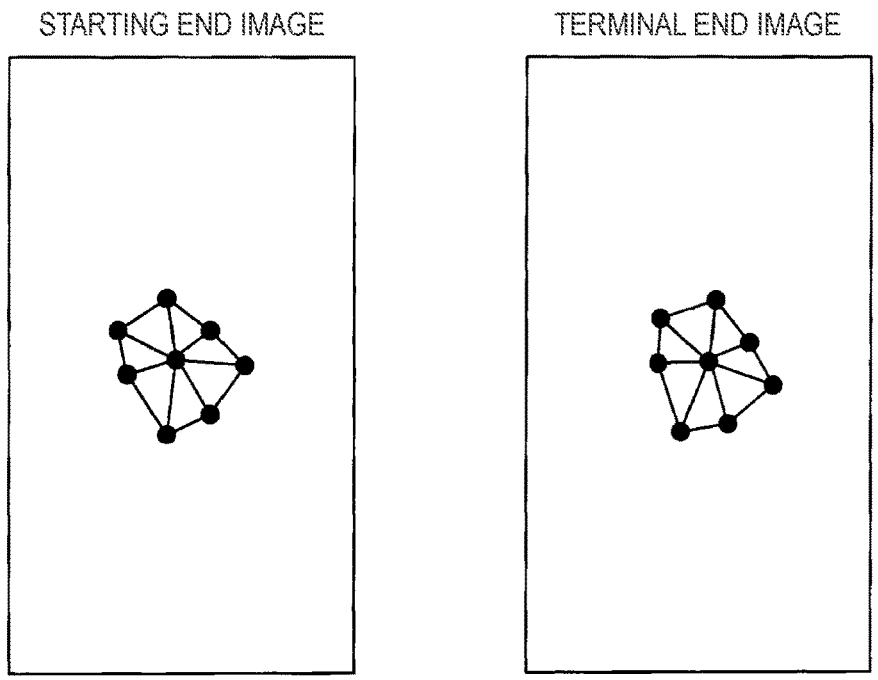
FIG. 8 is a view illustrating examples of feature points detected from the terminal end and the starting end of a 360-degree or more panoramic image data.
Figure 9:
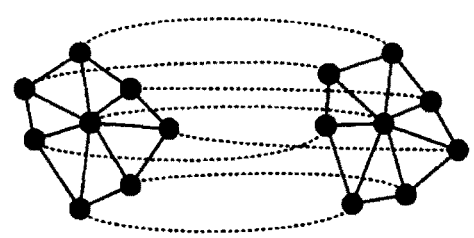
FIG. 9 is a view illustrating a corresponding relationship between the feature points detected from the terminal end and the starting end of the 360-degree or more panoramic image data.

For example, as illustrated in FIG. 8, a plurality of feature points (represented by black circle in FIG. 8) are extracted from each of the starting end and the terminal end of the 360-degree or more panoramic image data. In the feature points of the starting end and feature points of the terminal end, the feature points connected by dotted lines are corresponded with each other as illustrated in FIG. 9.

Further, FIG. 8 illustrates an example of feature point detection for a case where the subject in the terminal end of the 360-degree or more panoramic image data is slanted rightwardly with respect to the subject in the starting end of the 360-degree or more panoramic image data.

Next, the panoramic image generation unit 19 divides a plurality of feature points detected from the starting end of the 360-degree or more panoramic image data for each three points (step S62).

Specifically, the panoramic image generation unit 19 groups each triangle obtained by connecting adjacent three points among the plurality of feature points as a group, as illustrated in FIG. 8. Six groups are formed in the example of FIG. 8. Delaunay Triangulation or the like may be used as a method of dividing into groups.

Further, here, the feature points are grouped every three points, but may be grouped every four points or more. That is, the panoramic image generation unit 19 may group each n-polygon obtained by connecting adjacent n (n is a natural number of 3 or more) feature points among the plurality of feature points, each of which is detected from the starting end and the terminal end of the 360-degree or more panoramic image data, as a group, as illustrated in FIG. 8.

Next, the panoramic image generation unit 19 calculates an image deformation parameter for each triangle which is set with respect to each of the starting end and the terminal end of the 360-degree or more panoramic image data (step S63). As the image deformation parameter, for example, general affine transformation parameters are used.

The panoramic image generation unit 19 substitutes coordinates (x1, y1), (x2, y2), (x3, y3) of vertices of each triangle in the starting end of the 360-degree or more panoramic image data and coordinates (x1', y1'), (x2', y2'), (x3', y3'), that correspond to the three points, of feature points in the terminal end of the 360-degree or more panoramic image data into the following equation (1) which is a general affine transformation equation to calculate affine transformation parameters (a, b, c, d, s, t). (a, b, c, d) are image deformation parameters and (s, t) are the amount of image translation.

[Equation 1]

$$\begin{pmatrix} x' \\ y' \end{pmatrix} \begin{pmatrix} a & b \\ c & d \end{pmatrix} \begin{pmatrix} x \\ y \end{pmatrix} + \begin{pmatrix} s \\ t \end{pmatrix} \quad (1)$$

In Equation 1, x1, x2 and x3 are substituted into x, y1, y2 and y3 are substituted into y, x1', x2' and x3' are substituted into x', and y1', y2' and y3' are substituted into y'. By doing this, the following six simultaneous equations may be obtained. By solving the simultaneous equations, the affine transformation parameters (a, b, c, d, s, t) may be calculated.

$x1'=a*x1+b*y1+s$ $y1'=c*x1+d*y1+t$ $x2'=a*x2+b*y2+s$ $y2'=c*x2+d*y2+t$ $x3'=a*x3+b*y3+s$ $y3'=c*x3+d*y3+t$ [Equation 2]

Next, the panoramic image generation unit 19 deforms any one of a triangle in the starting end side and another triangle in the terminal end side corresponding to the triangle using the affine transformation parameters obtained for the pair of two triangles.

That is, the coordinate of each point of the triangle in the starting end side or the coordinate of each point of the triangle in the terminal end side are substituted into x and y in Equation 1 to deform the triangle in the starting end side or the triangle in the terminal end side. The deformation process is performed for each pair of the triangle in the starting end side and the triangle in the terminal end side (step S64).

By the process of step S64, the sizes and postures of the subject commonly included in the starting end and the terminal end of the 360-degree or more panoramic image data are matched with each other.

Further, when the subject A of the terminal end side is larger than the subject A of the starting end side, a deformation processing which enlarges the subject A of the starting end side is performed and thus, the subject A needs to be unified to the larger subject A. By doing this, more natural processed image may be obtained without generating a blank area.

Subsequently, the panoramic image generation unit 19 obtains an average value of difference between coordinates of feature points detected from the starting end of the 360-degree or more panoramic image data and coordinates of feature points, which correspond to the feature points, detected from the terminal end of the 360-degree or more panoramic image data to calculate a deviation amount (OffsetX) in the long length direction of the 360-degree or more panoramic image data and a deviation amount (OffsetY) in the short length direction of the 360-degree or more panoramic image data between the common subjects in the 360-degree or more panoramic image data (step S65).

The panoramic image generation unit 19 calculates OffsetX and OffsetY by the following equation (2) by setting the number of feature points detected from the starting end of the 360-degree or more panoramic image data to N, coordinates of the respective feature points as (x1, y1) to (xN, yN), and coordinates of feature points, which correspond to the respective feature points, of the terminal end side of the 360-degree or more panoramic image data as (x1', y1') to (xN', yN').

[Equation 3]

$$OffsetX = \frac{1}{N}\sum_{n=1}^{N}(x_n - x'_n) \quad (2)$$

$$OffsetY = \frac{1}{N}\sum_{n=1}^{N}(y_n - y'_n)$$

Next, the panoramic image generation unit 19 calculates the inclination amount (Δ), which is a ratio of a width (Width) in the long length direction of the 360-degree or more panoramic image data and OffsetY calculated by the equation (2), by the following equation (3) (step S66).

[Equation 4]

$$\text{INCLINATION } AMOUT\ (\Delta) = \frac{\text{DEVIATION AMOUNT IN VERTICAL DIRECTION } (OffsetY)}{\text{LATERAL WIDTH OF ENTIRE IMAGE (Width)}} \quad (3)$$

When an inclination amount (Δ) may be made zero, positions in the short length direction of the common subjects in the starting end and the terminal end of the 360-degree or more panoramic image data may be matched with each other.

The affine transformation equation for correcting the inclination amount (Δ) to zero becomes the following equation (4).

[Equation 5]

$$\begin{pmatrix} x' \\ y' \end{pmatrix} = \begin{pmatrix} 1 & 0 \\ \Delta*(-1) & 1 \end{pmatrix}\begin{pmatrix} x \\ y \end{pmatrix} + \begin{pmatrix} 0 \\ 0 \end{pmatrix} \quad (4)$$

When the inclination amount (Δ) is adapted to the affine transformation parameter, Δ is multiplied by (−1) as expressed in the equation (4) in order to restore inclination. Further, the equation (4) is given in the form with which coordinates (x', y') of image after deformation is obtained, but an equation form with which coordinates (x, y) of image before deformation is obtained becomes as follows.

[Equation 6]

$$\begin{pmatrix} x \\ y \end{pmatrix} = \begin{pmatrix} 1 & 0 \\ \Delta & 1 \end{pmatrix}\begin{pmatrix} x' \\ y' \end{pmatrix} + \begin{pmatrix} 0 \\ 0 \end{pmatrix} \quad (5)$$

The equation (5) may be obtained by applying an inverse matrix to the equation (5) and obtaining solution thereof.

The panoramic image generation unit 19 generates the image deformation parameter (affine transformation parameter) from the inclination amount (Δ) calculated at step S66 and deforms the principal subject of the starting end or the terminal end of the 360-degree or more panoramic image data using the affine transformation parameter.

That is, the panoramic image generation unit 19 substitutes coordinates of the respective feature points of the starting end side or coordinates of the respective feature points of the terminal end side into x', y' of the equation (5) to deform the principal subject of the starting end side or the terminal end side (step S67).

By the process of step S67, the positions in the short length direction (vertical direction) of the common subjects included in the starting end and the terminal end of the 360-degree or more panoramic image data are matched with each other.

Further, at step S8 of FIG. 6, the divided image data are overlapped with each other such that the common subjects are overlapped with each other according to OffsetX calculated at step S65 of FIG. 7.

As described above, the digital camera illustrated in FIG. 1 corrects the sizes and postures of the principal subjects commonly included in the starting end and the terminal end of the 360-degree or more panoramic image data by deforming the principal subject of any one of the starting end and the terminal end of the 360-degree or more panoramic image data, after generating the 360-degree or more panoramic image data.

Further, the digital camera corrects the position of the principal subject commonly included in the starting end and the terminal end of the 360-degree or more panoramic image data by deforming the principal subject of any one of the starting end and the terminal end of the 360-degree or more panoramic image data.

By the correction process, the entirety of the 360-degree or more panoramic image data becomes not distorted and thus, it becomes possible to generate natural 360-degree panoramic image data without discomfort.

Further, the digital camera divides the 360-degree or more panoramic image data and combines the two divided image data to generate the 360-degree panoramic image data.

In the correction method described in Patent Literatures 1 and 2, since the entirety of the 360-degree or more panoramic image data is distorted, when the 360-degree or more panoramic image data after correction is divided and the two divided image data are combined to generate the 360-degree panoramic image data, deviation occurs in the short length direction at both end portions of the 360-degree panoramic image data. Therefore, a wider width needs to be taken for cutting an upper portion and a lower portion of the 360-degree panoramic image data by the occurred deviation and thus, a size of image becomes small.

In contrast, according to the digital camera of FIG. 1, since the entirety of the 360-degree or more panoramic image data is not distorted, even when the 360-degree or more panoramic image data is divided and combined, deviation does not occur in the short length direction at both end portions of the 360-degree panoramic image data. Therefore, the width for cutting an upper portion and a lower portion of the 360-degree panoramic image data may be narrowed and thus, a size of image may be enlarged.

Further, in the description described above, both the first process and the second process are performed at the process of step S6 of FIG. 6, but a configuration in which any one of the first process and the second process is performed may be adopted. Even when it is such a configuration, natural 360-degree panoramic image data may be generated compared to a case where correction is not performed at all.

Further, the panoramic image generation unit 19 adds dummy feature points that were not detected from image in itself to the feature points detected at the process of step S61 of FIG. 7, and processes after step S62 is preferably performed including the dummy feature points.

Figure 10:
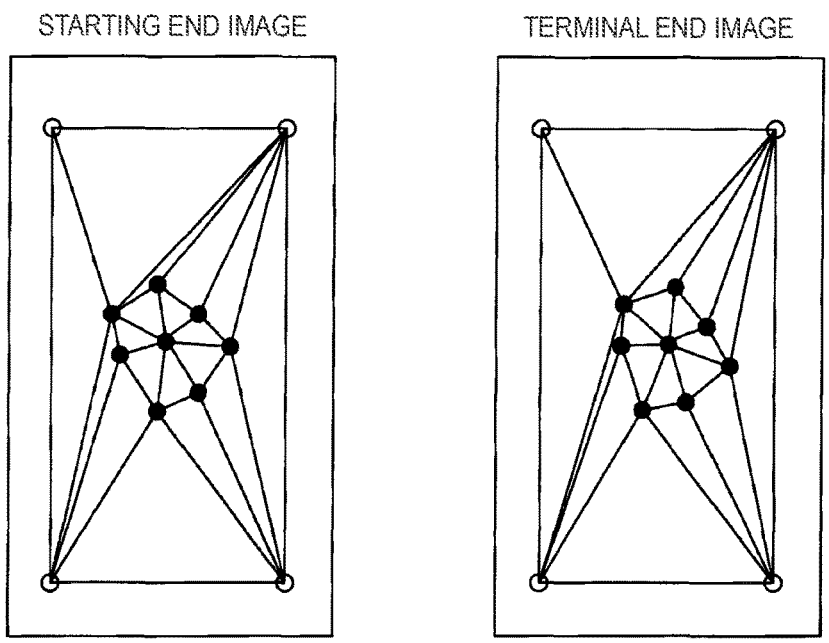
FIG. 10 is an explanatory view when adding dummy feature points to the feature points detected from the terminal end and the starting end of the 360-degree or more panoramic image data.

For example, as illustrated by the black circle of FIG. 10, when feature points are detected from the starting end and the terminal end of the 360-degree or more panoramic image data, the panoramic image generation unit 19 adds the dummy feature points illustrated by the white circle to a position located away from the detected feature points.

The dummy feature points are added to each of the starting end and the terminal end of the 360-degree or more panoramic image data such that a correspondence between any of the detected feature points of the starting end in the 360-degree or more panoramic image data and any of the detected feature points, which corresponds to the detected feature point, of the terminal end in the 360-degree or more panoramic image data of the terminal end becomes identical with each other.

Also, the panoramic image generation unit 19 forms a triangle by including the dummy feature points and performs deformation of image for each pair of triangles of starting end side and the terminal end side.

By doing this, a portion other than the principal subject commonly included in both the starting end and the terminal end among the starting end and the terminal end of the 360-degree or more panoramic image data may also be deformed. Therefore, the joint of the principal subject in the image after deformation and an image surrounding the image may be made inconspicuous and thus, an image quality may be enhanced.

Figure 11:
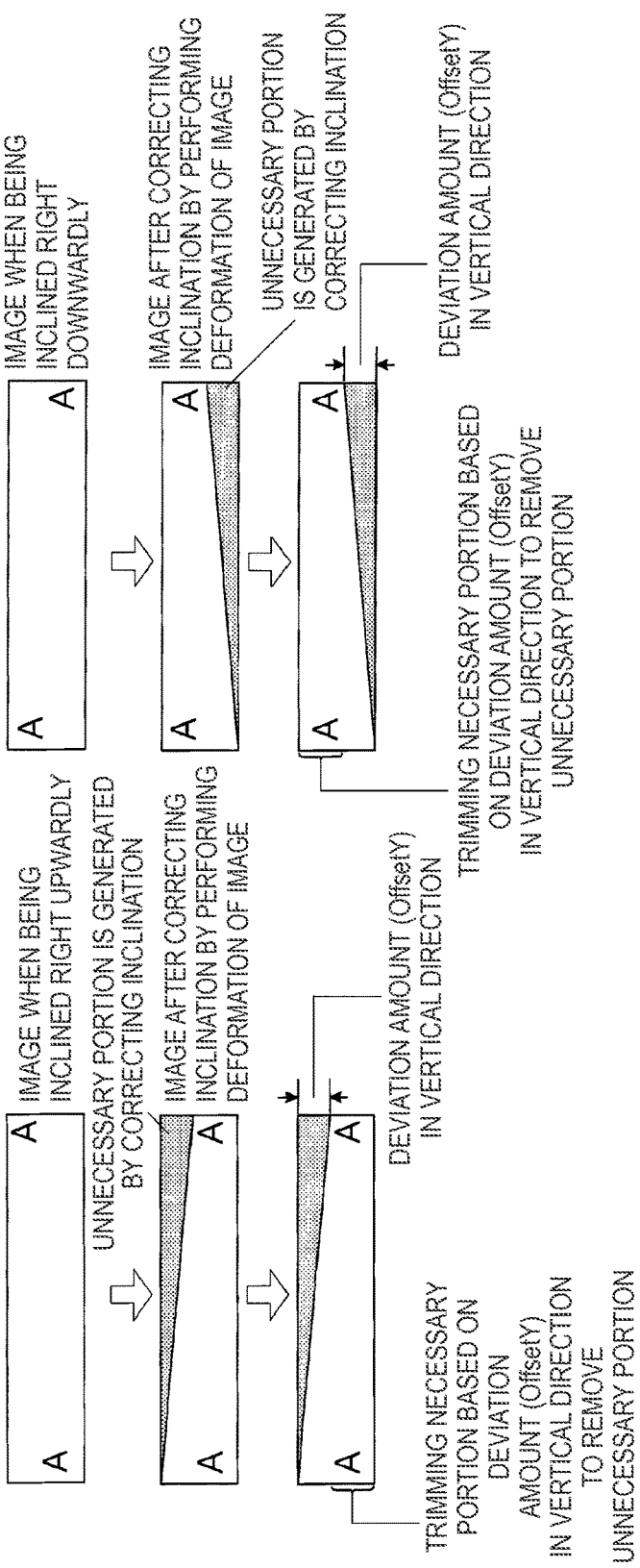
FIG. 11 is a view illustrating a modified example when trimming the 360-degree panoramic image data.

Further, when trimming the 360-degree panoramic image data at the process of step S9 of FIG. 6, the panoramic image generation unit 19 may determine a point to be trimmed based on OffsetY as illustrated in FIG. 11.

Further, the panoramic image generation unit 19 may store the 360-degree or more panoramic image data as well as the 360-degree panoramic image data in the recording medium 21.

Figure 12:
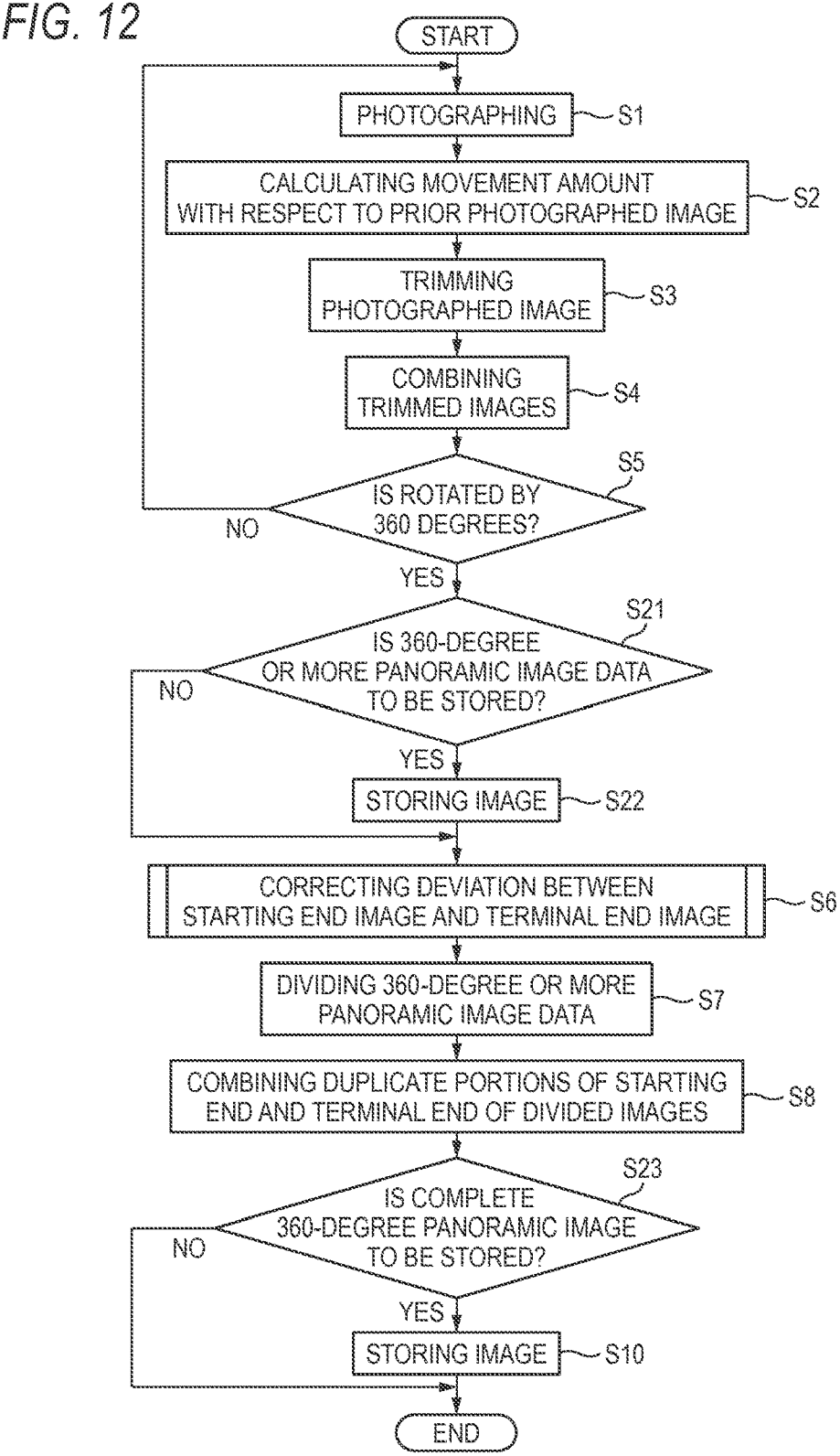
FIG. 12 is a flowchart for explaining a modified example of operations at the time of the panoramic photography mode of the digital camera illustrated in FIG. 1.

FIG. 12 is a flowchart for explaining a modified example of operations at the time of the panoramic photography mode of the digital camera illustrated in FIG. 1. In FIG. 12, similar reference numerals are given to the same process as FIG. 6, and descriptions thereof will be omitted.

When the determination result at step S5 is YES, the panoramic image generation unit 19 determines whether the 360-degree or more panoramic image data previously generated is to be stored in the recording medium 21 (step S21).

In the digital camera, whether the 360-degree or more panoramic image data is to be stored or not, or whether the 360-degree panoramic image data is to be stored or not may be set by the manipulation of the manipulation unit 14 before starting the photographing, and the panoramic image generation unit 19 performs the determination of step S21 based on the setting information.

Otherwise, the panoramic image generation unit 19 causes the display unit 23 to display message which confirms whether the 360-degree or more panoramic image data is to be stored and performs the determination of step S21 according to instruction information (information indicating to be stored or not to be stored) input from the manipulation unit 14 according to the message.

When the determination result at step S21 is YES, the panoramic image generation unit 19 stores the 360-degree or more panoramic image data in the recording medium 21 (step S22). When the determination result at step S21 is NO, the panoramic image generation unit 19 performs the determination of step S6.

After step S8, the panoramic image generation unit 19 determines whether the 360-degree panoramic image data generated at step S8 is to be stored in the recording medium 21 (step S23). This determination method is the same as in step S21.

When the determination result at step S23 is YES, the panoramic image generation unit 19 stores the 360-degree panoramic image data in the recording medium 21 (step S10).

When the determination result at step S23 is NO, the panoramic image generation unit 19 does not store the 360-degree panoramic image data, and ends the process.

Further, when the setting that the 360-degree panoramic image data needs not to be stored is made in advance, the panoramic image generation unit 19 may omit the processes of step S6~step S8 in FIG. 12.

As such, whether which one of the 360-degree or more panoramic image data 360 and the 360-degree panoramic image data is to be stored may be set by the photographer, such that usability of the digital camera may be enhanced.

Figure 13:
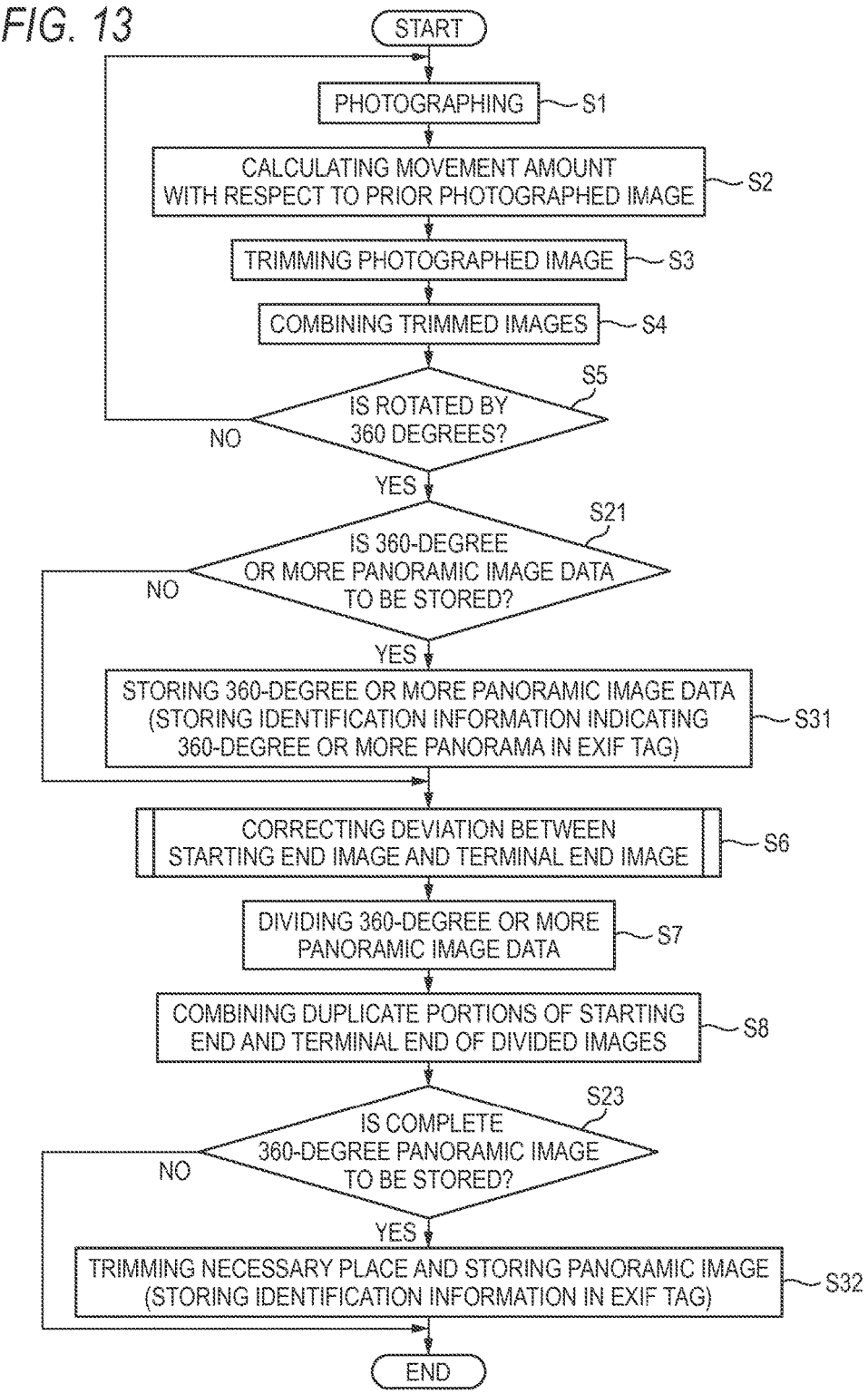
FIG. 13 is a flowchart for explaining another modified example of operations at the time of the panoramic photography mode of the digital camera illustrated in FIG. 1.

FIG. 13 is a flowchart for explaining another modified example of operations at the time of the panoramic photography mode of the digital camera illustrated in FIG. 1. In FIG. 13, similar reference numerals are given to the same process as FIG. 12, and descriptions thereof will be omitted.

When the determination result at step S21 is YES, the panoramic image generation unit 19 stores the 360-degree or more panoramic image data in the recording medium 21 after adding identification information indicating the 360-degree or more panoramic image data to an EXIF tag of the 360-degree or more panoramic image data.

Further, when the determination result at step S23 is YES, the panoramic image generation unit 19 stores the 360-degree panoramic image data in the recording medium 21 after adding identification information indicating the 360-degree panoramic image data to the EXIF tag of the 360-degree panoramic image data (step S32).

As such, it is possible to identify whether the panoramic image data is the 360-degree panoramic image data or the 360-degree or more panoramic image data by identification information stored in the EXIF tag attached to the panoramic image data. Therefore, when reproducing the panoramic image data, it is possible to change a reproduction method according to a panoramic image data type.

For example, when the instruction to reproduce the 360-degree panoramic image data is issued, the system control unit 11 performs control to reproduce the 360-degree panoramic image data endlessly.

Figure 14:
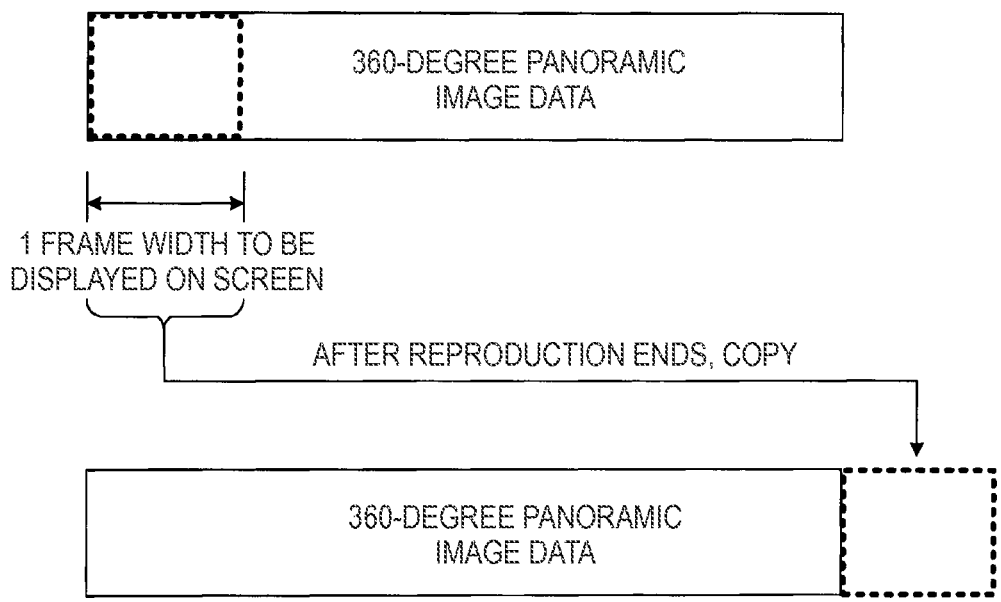
FIG. 14 is a view for explaining endless scroll of the 360-degree panoramic image data of the digital camera illustrated in FIG. 1.

For example, as illustrated in FIG. 14, when displaying of one frame of the 360-degree panoramic image data is ended, the system control unit 11 copies an image data by one frame to the tail end of the 360-degree panoramic image data in a memory for display. The system control unit 11 repeatedly performs such an operation. By doing this, the 360-degree panoramic image data will be scrolled forever in the display unit 23.

Further, one frame of the right end of the 360-degree panoramic image data may be copied to the left end of the 360-degree panoramic image data. Further, a width of image to be copied may be one frame or more.

When instruction to reproduce the 360-degree or more panoramic image data is issued, the system control unit 11 performs normal control which ends reproduction at the time when reproduction of all the frames of the 360-degree or more panoramic image data is ended.

As such, switching between endless scroll reproduction and normal scroll reproduction is made based on the identification information added to the EXIF tag to become an adequate display shape automatically without requiring setting by the user of the digital camera and thus, a product with additional value may be implemented.

Further, the 360-degree panoramic image data generated by the digital camera of FIG. 1 is not entirely distorted in general. Therefore, editing of the 360-degree panoramic image data may be made easily.

Figure 15:
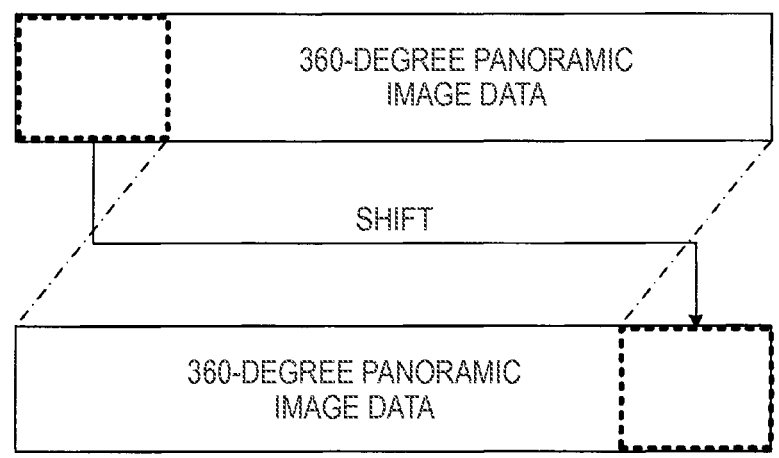
FIG. 15 is a view for explaining an editing process of the 360-degree panoramic image data of the digital camera illustrated in FIG. 1.

For example, as illustrated in FIG. 15, the system control unit 11 clips the image data (broken line) by a width designated by the user through the manipulation unit 14 from the left end of the 360-degree panoramic image data, and the left end of the clipped image data is joined to the right end of the 360-degree panoramic image data. By doing this, the 360-degree panoramic image data in which a reproduction start position is changed may be easily generated.

Further, the system control unit 11 clips the image data (broken line) by a width designated by the user from the right end of the 360-degree panoramic image data, and the right end of the clipped image data may be joined to the left end of the 360-degree panoramic image data. Whether the image is to be clipped from which end of the 360-degree panoramic image data needs to be in compliance with instruction of the user.

In the digital camera of FIG. 1, a method in which a central portion of the photographed image in the long length direction is trimmed and the trimmed images are sequentially combined is adopted as an example of a 360-degree or more panoramic image data generation method.

According to this method, when combining the trimmed images, parallax between images to be combined is small, cylinder conversion as described in Patent Literatures 1 and 2 becomes unnecessary and thus, processing load may be largely reduced.

Further, according to this method, the n-th photographed image data may be deleted after combination of the trimmed image of the n-th photographed image data and the trimmed image of the n+1-th photographed image data is ended and thus, a use amount of memory may be reduced.

Further, combining of the trimmed images is performed in real time in parallel with the consecutively photographing and thus, a time required for generating the 360-degree or more panoramic image data 360 may be shortened.

Figure 16:
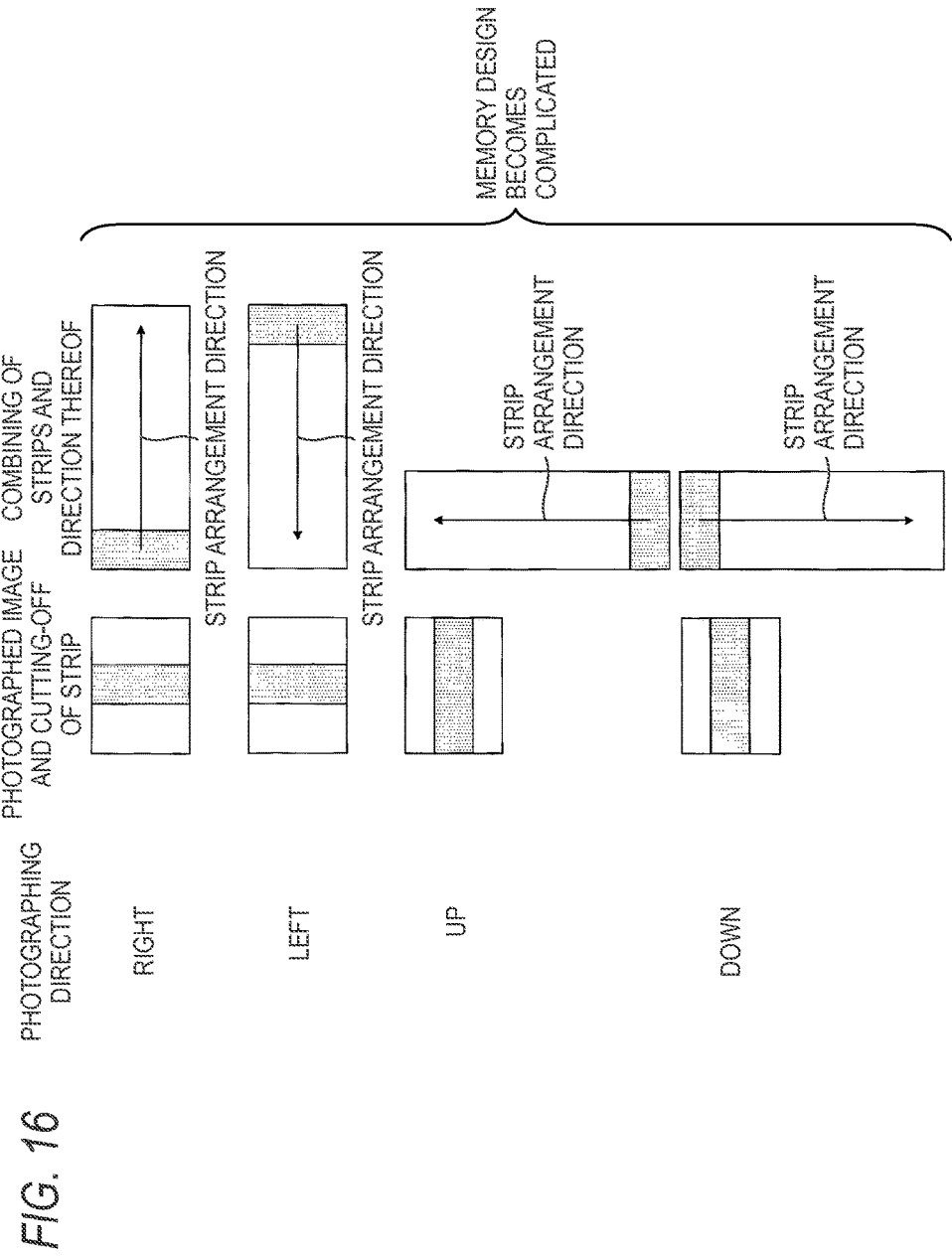
FIG. 16 is a view for explaining a memory use method at the time of generating the 360-degree or more panoramic image data of the digital camera illustrated in FIG. 1.

In the meantime, in this method, since the trimmed images are combined in the order of photographing, as illustrated in FIG. 16, when the rotation direction of the digital camera is a counter clockwise direction, the trimmed image is to be stored from the right end to the left end on the memory.

Further, as illustrated in FIG. 16, when the rotation direction of the digital camera is an upward direction, the trimmed image is to be stored from the lower end to the upper end on the memory.

Further, as illustrated in FIG. 16, when the rotation direction of the digital camera is a downward direction, the trimmed image is to be stored from the upper end to the lower end on the memory.

As in FIG. 16, when a use method of memory is changed according to the rotation direction of the digital camera, memory design becomes complicated.

Accordingly, it is preferable that a memory use method when the rotation direction of the digital camera is the right direction may be adopted, irrespective of the rotation direction of the digital camera.

Figure 17:
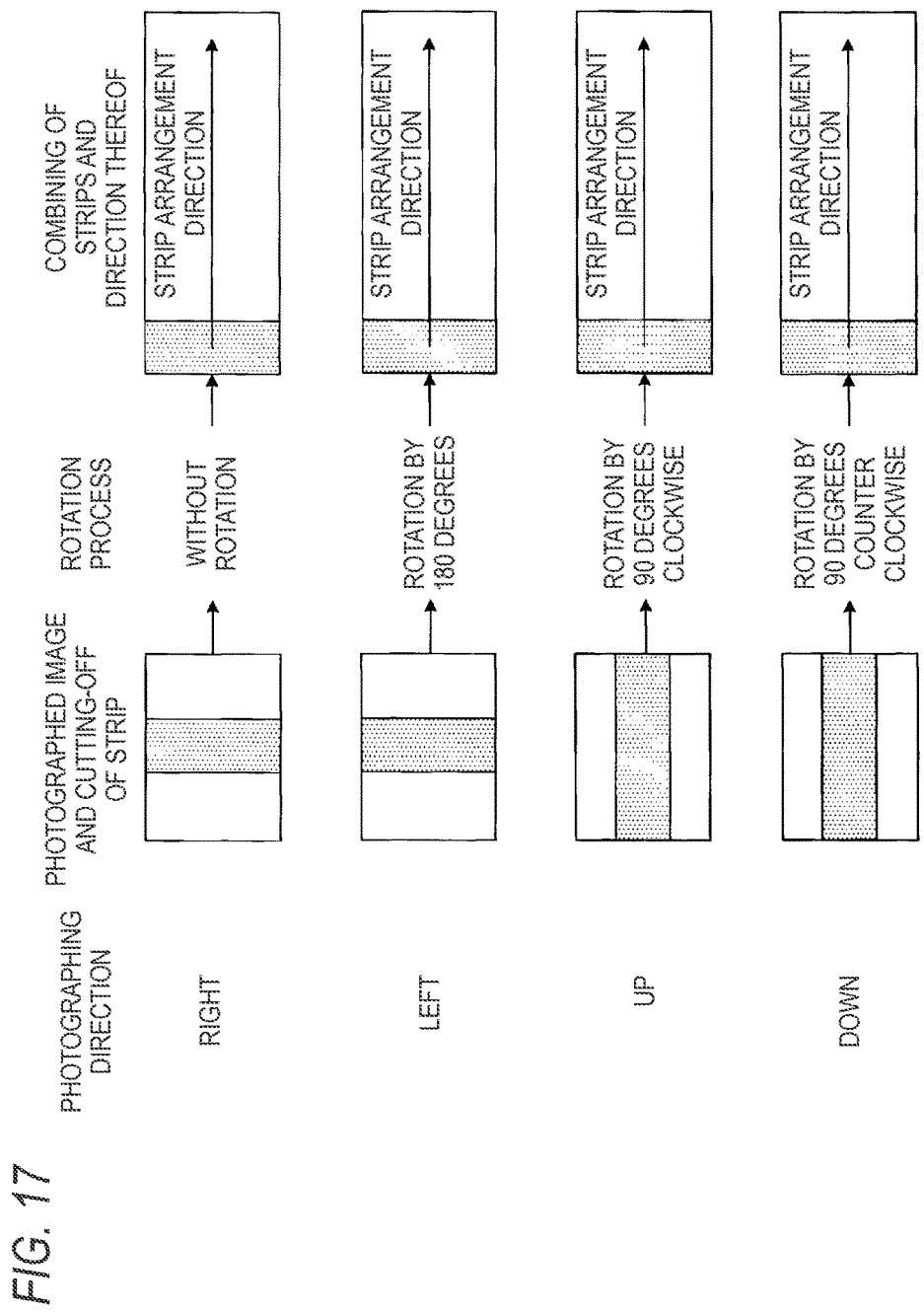
FIG. 17 is a view for explaining another memory use method at the time of generating the 360-degree panoramic image data or more of the digital camera illustrated in FIG. 1.

In the digital camera of FIG. 1, when the rotation direction of the digital camera is the left direction, as illustrated in FIG. 17, the panoramic image generation unit 19 performs a process of rotating the trimmed image by 180 degrees and then, stores the trimmed image in the memory. Further, when the rotation direction of the digital camera is the upward direction, as illustrated in FIG. 17, the panoramic image generation unit 19 performs a process of rotating the trimmed image by 90 degrees clockwise and then, stores the trimmed image in the memory. Further, when the rotation direction of the digital camera is the downward direction, as illustrated in FIG. 17, the panoramic image generation unit 19 performs a process of rotating the trimmed image by 90 degrees counter clockwise and then, stores the trimmed image in the memory.

The memory use method may be made unified to one method by performing such a rotation processing and thus, the memory design becomes easy.

As having been described above, the following matters are described in the present description.

It is a disclosed panoramic image generation method which generates a surrounding 360-degree panoramic image data centering around a photographing point using a plurality of photographed image data, wherein, a same subject is included in each of first photographed image data which is time-serially obtained and last photographed image data which is time-serially obtained among the plurality of the photographed image data, the panoramic image generation method comprising: a first step of combining the plurality of the photographed image data to generate a surrounding 360-degree or more panoramic image data centering around the photographing point; a second step of performing at least one of a first process in which any of the subject of a starting end and the subject of a terminal end is deformed with respect to the subject included in each of the starting end and the terminal end of the surrounding 360-degree or more panoramic image data, to match a size and a posture of the subject of the starting end with those of the subject of the terminal end, and a second process in which any of the subject of the starting end and the subject of the terminal end is deformed with respect to the subject included in each of the starting end and terminal end of the surrounding 360-degree or more panoramic image data, to match positions in a short length direction of the surrounding 360-degree or more panoramic image data; and a third step of overlapping the subjects respectively included in the starting end and the terminal end of the surrounding 360-degree or more panoramic image data with each other, to generate the surrounding 360-degree panoramic image data, after the second step.

It is the disclosed panoramic image generation method, wherein in the second step, both the first process and the second process are performed in this order.

It is the panoramic image generation method, wherein in the third step, overlapping the subjects included in the starting end and the terminal end of the surrounding 360-degree or more panoramic image data, respectively, to generate the surrounding 360-degree panoramic image data after dividing the surrounding 360-degree or more panoramic image data.

It is the panoramic image generation method, wherein the first process includes; a feature points extracting process of extracting feature points of the subject of the starting end and feature points of the terminal end that corresponds to the feature points of the starting end, and an image deforming process of performing a process of deforming image within any one of starting end side n-polygons each connecting adjacent n (n is a natural number of 3 or more) first feature points extracted from the subject of the starting end and a terminal end side n-polygons formed by second feature points extracted from the subject of the terminal end corresponding to the first feature points, the image deforming process being performing by each pair of the starting end n-polygon and the terminal end n-polygon.

It is the panoramic image generation method, wherein the first process includes a feature points addition process of adding dummy feature points to the first feature points and the second feature points extracted in the feature points extracting process, and the image deforming process deforms the image according to the first feature points and the second feature points that include the dummy feature points.

It is an image capturing apparatus comprising: a panoramic image generation unit configured to perform each step of the panoramic image generation method; and an image capturing unit configured to obtain the plurality of the photographed image data.

It is the image capturing apparatus, further comprising: an information input unit configured to input information for designating as to whether the surrounding 360-degree or more panoramic image data and the surrounding 360-degree panoramic image data is to be stored in a recording medium; and a recording unit configured to record the panoramic image data designated to be stored according to the information in the recording medium.

It is the image capturing apparatus, wherein the recording unit adds identification information that indicates the surrounding 360-degree or more panoramic image data to a header of the surrounding 360-degree or more panoramic image data when the surrounding 360-degree or more panoramic image data is to be recorded in the recording medium, and adds identification information that indicates the surrounding 360-degree panoramic image data to a header of the surrounding 360-degree panoramic image data when the surrounding 360-degree panoramic image data is to be recorded in the recording medium.

It is the image capturing apparatus, further comprising: a reproduction control unit configured to perform scroll-reproducing any one of the surrounding 360-degree or more panoramic image data and the surrounding 360-degree panoramic image data on the display unit, and wherein the reproduction control unit determines whether the image data for which instruction to reproduce is issued corresponds to which one of the surrounding 360-degree or more panoramic image data and the surrounding 360-degree panoramic image data from information of the header of the panoramic image data, and scroll-reproduces the surrounding 360-degree panoramic image data endlessly in a case where the image data for which instruction to reproduce is issued is the surrounding 360-degree panoramic image data and stops reproducing at the time when all areas of the surrounding 360-degree panoramic image data are reproduced in a case where the image data for which instruction to reproduce is issued is the surrounding 360-degree or more panoramic image.

It is the image capturing apparatus, further comprising: an image editing unit configured to clip the image data by a designated width from one end of the surrounding 360-degree panoramic image data, and join the one end of the clipped image data to the other end of the surrounding 360-degree panoramic image data.

INDUSTRIAL APPLICABILITY

The panoramic image generation method and the image capturing apparatus of the present invention may generate the 360-degree panoramic image data without discomfort.

While the present invention is described in detail and with reference to a specific embodiment, it is apparent to an ordinary skilled person in the art that various changes and modification may be made without departing from a scope or spirit of the present invention.

This application is based on and claims priority from Japanese Patent Application No. 2011-161328, filed on Jul. 22, 2011, with Japanese Patent Office, the disclosure of which is incorporated herein in its entirety by reference.

REFERENCE SIGNS LIST

5: solid-state image capturing element
11: system control unit
19: panoramic image generation unit

The invention claimed is:

1. A panoramic image generation method which generates a surrounding 360-degree panoramic image data centering around a photographing point using a plurality of photographed image data obtained by a camera, wherein,
   a same subject, which is an external object photographed by said camera while photographing said plurality of photographed image data, is included in each of first photographed image data which is time-serially obtained and last photographed image data which is time-serially obtained among the plurality of the photographed image data, said subject having a particular size, posture, and position in each of said first and last photographed image data dependent on a respective photographing position of said camera,
   the panoramic image generation method comprising:
   a first step of combining the plurality of the photographed image data to generate a surrounding 360-degree or more panoramic image data centering around the photographing point;
   a second step of performing
      a first process in which any of the subject of a starting end and the subject of a terminal end is deformed with respect to the subject included in each of the starting end and the terminal end of the surrounding 360-degree or more panoramic image data, to match a size and a posture of the subject of the starting end with those of the subject of the terminal end, or
      the first process, and a second process in which any of the subject of the starting end and the subject of the terminal end is deformed with respect to the subject included in each of the starting end and terminal end of the surrounding 360-degree or more panoramic image data, to match positions in a short length direction of the surrounding 360-degree or more panoramic image data; and
   a third step of overlapping the subjects respectively included in the starting end and the terminal end of the surrounding 360-degree or more panoramic image data with each other, to generate the surrounding 360-degree panoramic image data, after the second step,
   wherein the first process includes:
      a feature points extracting process of extracting feature points of the subject of the starting end and feature points of the terminal end that corresponds to the feature points of the starting end, and
      an image deforming process of performing a process of deforming image within any one of starting end side n-polygons each connecting adjacent n (n is a natural number of 3 or more) first feature points extracted from the subject of the starting end and terminal end side n-polygons formed by second feature points extracted from the subject of the terminal end corresponding to the first feature points, the image deforming process being performed on each corresponding pair of starting end n-polygon and terminal end n-polygon by, calculating an average deviation amount in the vertical direction between the n first feature points and the n second feature points, calculating an inclination amount based on a ratio of the average deviation amount and a lateral width of panoramic image, and deforming the image within one of the starting end n-polygon and the terminal end n-polygon based on an image deformation parameter for correcting deviation in the vertical direction, said image deformation parameter being calculated according to the following equation:

$$\begin{pmatrix} x \\ y \end{pmatrix} = \begin{pmatrix} 1 & 0 \\ \Delta & 1 \end{pmatrix} \begin{pmatrix} x' \\ y' \end{pmatrix} + \begin{pmatrix} 0 \\ 0 \end{pmatrix},$$

where $\Delta$ represents the inclination amount, x' and y' represent coordinates of respective feature points of the one of the starting end n-polygon and the terminal end n-polygon before the image deformation, and x and y represent coordinates of the respective feature points of the one of the starting end n-polygon and the terminal end n-polygon after the image deformation.

2. The panoramic image generation method according to claim 1,
wherein in the second step, both the first process and the second process are performed in this order.

3. The panoramic image generation method according to claim 1,
wherein in the third step, overlapping the subjects included in the starting end and the terminal end of the surrounding 360-degree or more panoramic image data, respectively, to generate the surrounding 360-degree panoramic image data after dividing the surrounding 360-degree or more panoramic image data.

4. The panoramic image generation method according to claim 1,
wherein the first process includes a feature points addition process of adding dummy feature points to the first feature points and the second feature points extracted in the feature points extracting process, and
the image deforming process deforms the image according to the first feature points and the second feature points that include the dummy feature points.

5. An image capturing apparatus comprising:
a panoramic image generation unit configured to perform each step of the panoramic image generation method according to claim 1; and
said camera configured to obtain the plurality of the photographed image data.

6. The image capturing apparatus according to claim 5, further comprising:
an information input unit configured to input information for designating as to whether the surrounding 360-degree or more panoramic image data and the surrounding 360-degree panoramic image data is to be stored in a recording medium; and
a recording unit configured to record the panoramic image data designated to be stored according to the information in the recording medium.

7. The image capturing apparatus according to claim 6,
wherein the recording unit adds identification information that indicates the surrounding 360-degree or more panoramic image data to a header of the surrounding 360-degree or more panoramic image data when the surrounding 360-degree or more panoramic image data is to be recorded in the recording medium, and adds identification information that indicates the surrounding 360-degree panoramic image data to a header of the surrounding 360-degree panoramic image data when the surrounding 360-degree panoramic image data is to be recorded in the recording medium.

8. The image capturing apparatus according to claim 7, further comprising:
a reproduction control unit configured to perform scroll-reproducing any one of the surrounding 360-degree or more panoramic image data and the surrounding 360-degree panoramic image data on the display unit, and
wherein the reproduction control unit determines whether the image data for which instruction to reproduce is issued corresponds to which one of the surrounding 360-degree or more panoramic image data and the surrounding 360-degree panoramic image data from information of the header of the panoramic image data, and scroll-reproduces the surrounding 360-degree panoramic image data endlessly in a case where the image data for which instruction to reproduce is issued is the surrounding 360-degree panoramic image data and stops reproducing at the time when all areas of the surrounding 360-degree panoramic image data are reproduced in a case where the image data for which instruction to reproduce is issued is the surrounding 360-degree or more panoramic image.

9. The image capturing apparatus according to claim 5, further comprising:
an image editing unit configured to clip the image data by a designated width from one end of the surrounding 360-degree panoramic image data, and join the one end of the clipped image data to the other end of the surrounding 360-degree panoramic image data.

* * * * *